United States Patent
Wang et al.

(10) Patent No.: US 10,206,218 B2
(45) Date of Patent: Feb. 12, 2019

(54) WIFI CHANNEL SELECTION AND SUBCHANNEL SELECTIVE TRANSMISSIONS

(71) Applicant: InterDigital Patent Holdings, Inc., Wilmington, DE (US)

(72) Inventors: Xiaofei Wang, Cedar Grove, NJ (US); Guodong Zhang, Syosset, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 14/896,012

(22) PCT Filed: Jun. 6, 2014

(86) PCT No.: PCT/US2014/041231
§ 371 (c)(1),
(2) Date: Dec. 4, 2015

(87) PCT Pub. No.: WO2014/197764
PCT Pub. Date: Dec. 11, 2014

(65) Prior Publication Data
US 2016/0135199 A1  May 12, 2016

Related U.S. Application Data

(60) Provisional application No. 61/831,988, filed on Jun. 6, 2013.

(51) Int. Cl.
*H04W 72/08* (2009.01)
*H04W 74/08* (2009.01)
*H04W 84/12* (2009.01)

(52) U.S. Cl.
CPC ..... *H04W 72/085* (2013.01); *H04W 74/0816* (2013.01); *H04W 84/12* (2013.01)

(58) Field of Classification Search
None
See application file for complete search history.

(56) References Cited

U.S. PATENT DOCUMENTS

| | | |
|---|---|---|
| 2008/0080474 A1 | 4/2008 | Kitchin et al. |
| 2012/0113952 A1 | 5/2012 | Kneckt et al. |

(Continued)

FOREIGN PATENT DOCUMENTS

| | | |
|---|---|---|
| JP | 2013-518459 A | 5/2013 |
| WO | WO 2012/064502 A1 | 5/2012 |

(Continued)

OTHER PUBLICATIONS

Cheong, Minho, "TGah Functional Requirements and Evaluation Methodology Rev. 5", IEEE 802.11-11/0905r5, Jan. 2012, 20 pages.

(Continued)

*Primary Examiner* — Steven H Nguyen
(74) *Attorney, Agent, or Firm* — Volpe and Koenig, P.C.

(57) ABSTRACT

Systems, methods, and instrumentalities are provided to implement data transmission, comprising: receiving a first signal from an access point (AP) indicating that a primary channel is associated with a first frequency band associated with a first period of time; determining by an IEEE 802.11 station (STA) that a channel condition associated with a secondary channel is better than a channel condition associated with the primary channel; reserving the primary channel associated with the first frequency, wherein the reserving of the primary channel comprises occupying or reserving the primary channel during the first period of time; and sending data over the secondary channel while the primary channel is occupied or reserved.

12 Claims, 9 Drawing Sheets

(56) References Cited

U.S. PATENT DOCUMENTS

| | | | |
|---|---|---|---|
| 2012/0170534 A1* | 7/2012 | Kim | H04H 20/42 370/329 |
| 2012/0218956 A1 | 8/2012 | Kim et al. | |
| 2012/0224612 A1* | 9/2012 | Kim | H04L 1/0003 375/219 |
| 2013/0109403 A1* | 5/2013 | Kim | H04W 16/14 455/454 |
| 2014/0044073 A1* | 2/2014 | Kim | H04W 72/0453 370/329 |
| 2014/0086200 A1* | 3/2014 | Seok | H04W 72/02 370/330 |
| 2014/0098724 A1* | 4/2014 | Park | H04W 72/02 370/311 |
| 2014/0112246 A1* | 4/2014 | Park | H04W 74/002 370/328 |
| 2014/0204891 A1* | 7/2014 | Park | H04W 56/00 370/329 |
| 2014/0254540 A1* | 9/2014 | Kim | H04W 72/02 370/329 |
| 2014/0314032 A1* | 10/2014 | Kim | H04W 16/14 370/329 |
| 2014/0376474 A1* | 12/2014 | Lee | H04W 16/14 370/329 |
| 2015/0063332 A1* | 3/2015 | Lee | H04W 74/002 370/338 |
| 2015/0139099 A1* | 5/2015 | Lee | H04W 72/00 370/329 |

FOREIGN PATENT DOCUMENTS

| | | |
|---|---|---|
| WO | WO 2012/172157 A1 | 12/2012 |
| WO | 2013028629 A2 | 2/2013 |

OTHER PUBLICATIONS

Costa et al., "Review of Overlapping 802.11 Networks (OBSS) Status and IEEE 802.11 Solutions", IEEE 802.11-12/936r0, Jul. 2012, 13 pages.

Gong et al., "11 ah Channelization of China", IEEE 802.11-11/1320r0, Sep. 2011, 5 pages.

IEEE, "Draft Standard for Information technology-Telecommunications and Information Exchange Between Systems Local and Metropolitan Area Networks-Specific Requirements, Part 11: Wireless LAN Medium Access Control (MAC) and Physical Layer (PHY) Specifications, Amendment 6: Sub 1 GHz License Exempt Operation", IEEE P802.11ah™/D0.1, May 2013.

IEEE, "Telecommunications and Information Exchange Between Systems Local and Metropolitan Area Networks-Specific Requirements Part 11: Wireless LAN Medium Access Control (MAC) and Physical Layer (PHY) Specifications Amendment 2: MAC Enhancements for Robust Audio Video Streaming", IEEE Std 802.11aa™, Mar. 2012.

IEEE, "Telecommunications and Information Exchange Between Systems —LAN/MAN—Specific Requirements—Part 11: Wireless LAN Medium Access Control and Physical Layer Specifications—Amd 4: Enhancements for Very High Throughput for operation in bands below 6GHz", IEEE P802.11ac/D3.0, Jun. 2012.

IEEE, "Telecommunications and Information Exchange Between Systems—Local and Metropolitan Area Networks—Specific Requirements—Part 11: Wireless LAN Medium Access Control (MAC) and Physical Layer (PHY) Specifications", IEEE P802.11-REVmb/D12, Apr. 2013.

IEEE, "Telecommunications and Information Exchange Between Systems—Local and Metropolitan Area Networks—Specific Requirements—Part 11: Wireless LAN Medium Access Control (MAC) and Physical Layer (PHY) Specifications", IEEE Std 802.11™-2012, 2012, 1 page.

Merlin et al., "Channel indication in RAW/TWT", IEEE 802.11-13/0071r0, Jan. 2013, 14 pages.

Park et al., "Frequency Selective "Narrow-Band" Transmission by STA associated in a "Wide BW" BSS", IEEE 802.11-12/1338r0, Nov. 2012, 14 pages.

Wong, et al., IEEE P802.11ah/D0.1, Draft Standard for Information technology—Telecommunications and information exchange between systems Local and metropolitan area networks—Specific requirements, Part 11: Wireless LAN Medium Access Control (MAC) and Physical Layer (PHY) Specifications, Amendment 6: Sub 1GHz License Exempt Operation, IEEE 802.11-13/0500r0, May 2013, 330 pages.

JP 2013-518459, US 2012-170534 A1

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-REVmb/D12 (Nov. 2011).

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2012 (Mar. 29, 2012).

IEEE Draft Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-REVmc/D1.2 (Apr. 2013).

* cited by examiner

| Channel Activity Bitmap | UL Activity | DL Activity | Maximum Transmission Width | Activity Start Time |
|---|---|---|---|---|
| 8 | 1 | 1 | 2 | 20 |

Bits:

FIG. 5

| Channel Activity Bitmap | UL Activity | DL Activity | Maximum Transmission Bandwidth | Primary/Access Channel Indication | Activity Start Time |

FIG. 7

WIFI CHANNEL SELECTION AND SUBCHANNEL SELECTIVE TRANSMISSIONS

CROSS REFERENCE TO RELATED APPLICATIONS

This application is the National Stage Entry under 35 U.S.C. § 371 of Patent Cooperation Treaty Application No. PCT/US2014/041231, filed Jun. 6, 2014, which claims the benefit of U.S. Provisional Patent Application No. 61/831,988, filed Jun. 6, 2013, the contents of which are hereby incorporated by reference as if fully set forth herein.

BACKGROUND

Wireless networks (e.g., IEEE 802.11ac based networks) may provide access points (APs) for one or more stations (STAs) in a basic service set (BSS) with one or more operating channels. An AP may indicate that one or more channels may be used for operation. A channel selected by the AP may not be the channel that should be used for at least some of the STAs (e.g., it may not be an optimal channel for one or more STAs). For example, a channel that may be optimal for one STA may not be optimal for other STAs in the same BSS. And, for example, different sets of STA may be monitoring and attempting to access different channels and may not be aware of the channel access attempts or ongoing transmissions by other STAs in the same BSS.

SUMMARY OF THE INVENTION

Systems, methods, and instrumentalities are provided to implement subchannel selective transmission. A first signal may be received by an IEEE 802.11 station (STA) from an access point (AP) indicating that a primary channel is associated with a first frequency band associated with a first period of time. A determination that a channel condition associated with a secondary channel is better than a channel condition associated with the primary channel may be made. The primary channel associated with the first frequency may be reserved, wherein the reserving of the primary channel comprises occupying or reserving the primary channel during the first period of time. Data may be sent over the secondary channel while the primary channel is occupied or reserved.

A subchannel selective transmission (SST) capability may be indicated by an AP, or a STA, or by both. The primary channel and/or access channel may be implicitly or explicitly indicated. A STA and an AP may reserve the medium by setting a network allocation vector (NAV) on one channel, or on multiple channels. An AP may specify intervals for transmissions.

BRIEF DESCRIPTION OF THE DRAWINGS

FIG. 5 depicts an exemplary format for the channel activity schedule subfield included in the SST element.
FIG. 7 depicts an example design of the channel activity schedule subfield.

DETAILED DESCRIPTION

A detailed description of illustrative embodiments is described with reference to the various figures. Although this description provides a detailed example of possible implementations, it should be noted that the details are intended to be exemplary and in no way limit the scope of the application. In addition, the figures may illustrate one or more message charts, which are meant to be exemplary (the messages may be varied, reordered, or even omitted where appropriate).

Figure 1A:
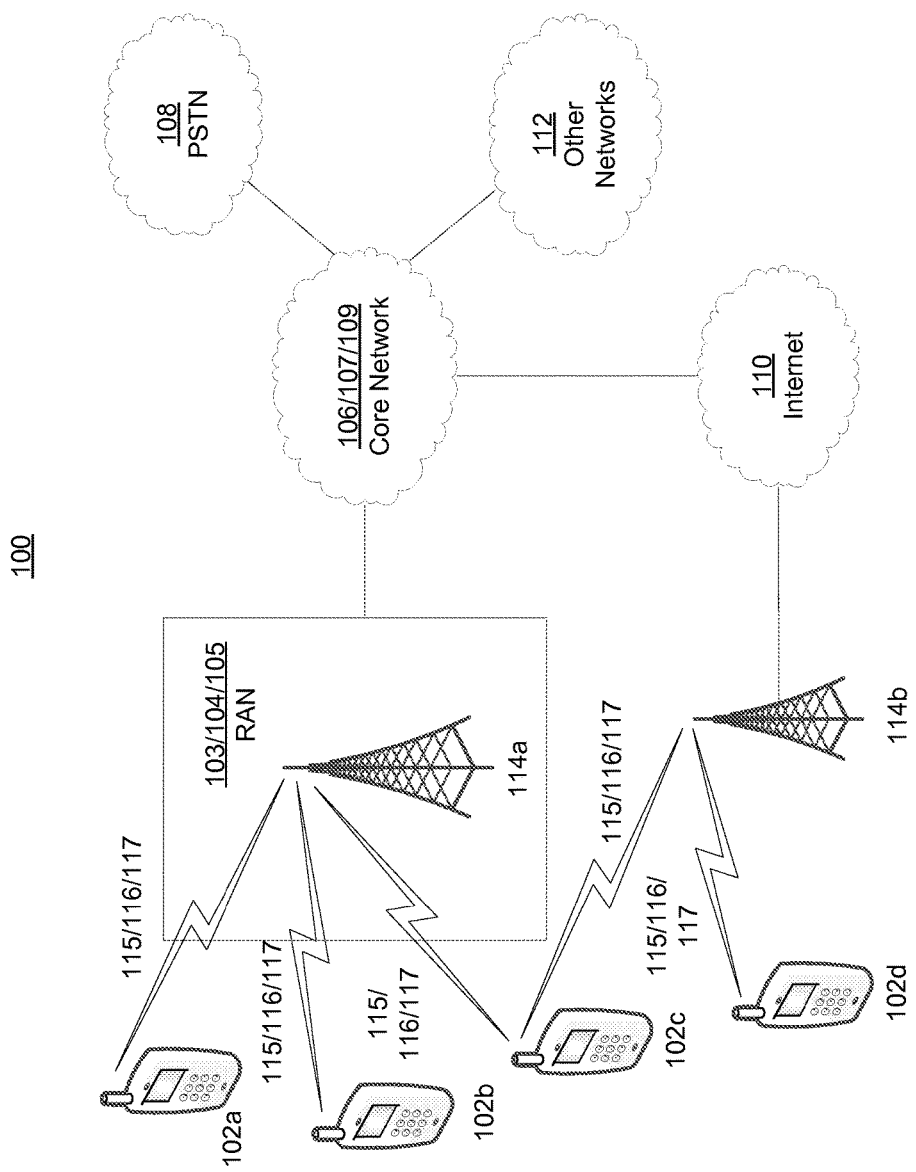
FIG. 1A depicts an exemplary communications system.

FIG. 1A is a diagram of an example communications system 100 in which one or more disclosed features may be implemented. For example, a wireless network (e.g., a wireless network comprising one or more components of the communications system 100) may be configured such that bearers that extend beyond the wireless network (e.g., beyond a walled garden associated with the wireless network) may be assigned QoS characteristics.

The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include at least one wireless transmit/receive unit (WTRU), such as a plurality of WTRUs, for instance WTRUs 102a, 102b, 102c, and 102d, a radio access network (RAN) 104, a core network 106, a public switched telephone network (PSTN) 108, the Internet 110, and other networks 112, though it should be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it should be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it should be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
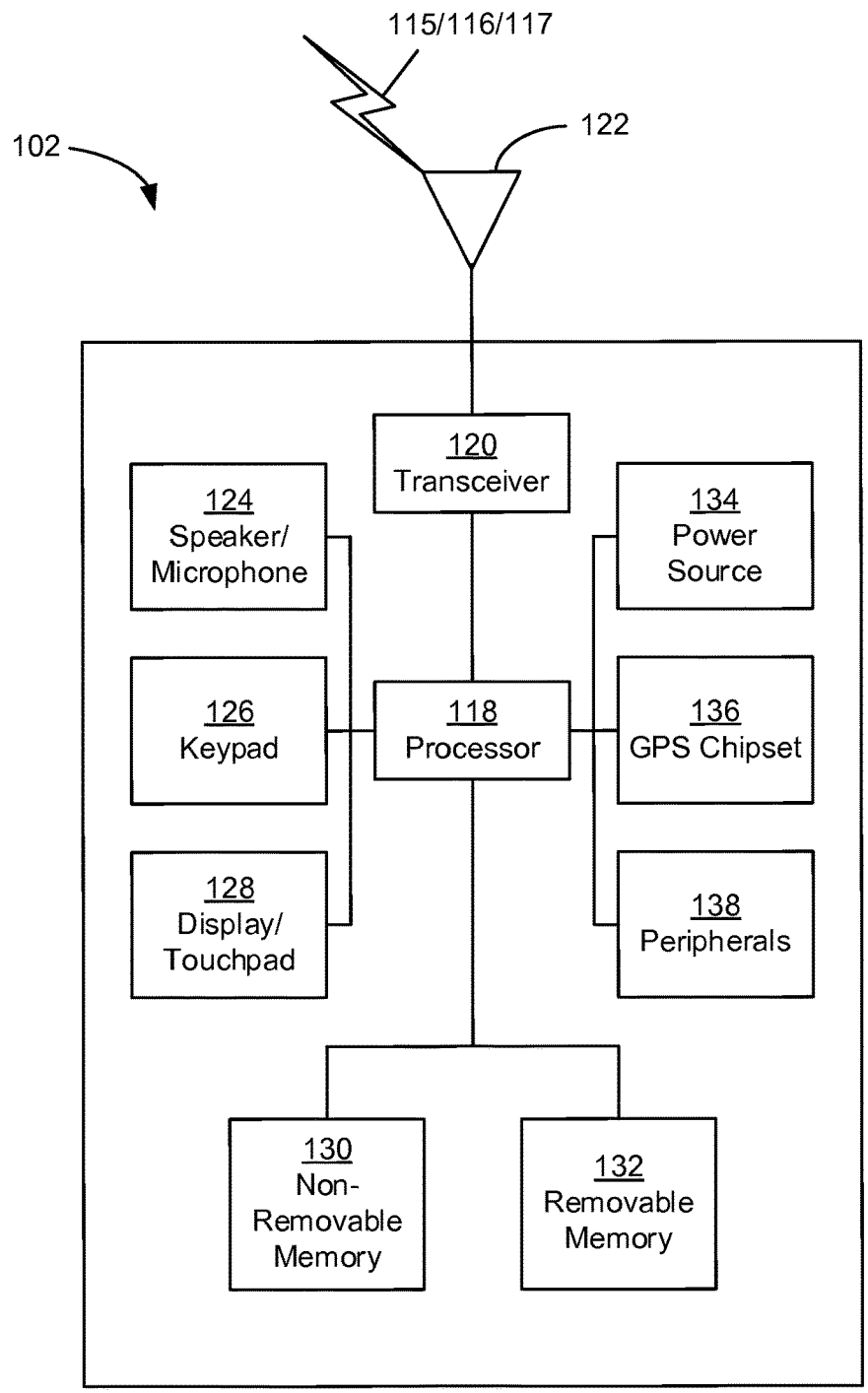
FIG. 1B depicts an exemplary wireless transmit/receive unit (WTRU).

FIG. 1B depicts an exemplary wireless transmit/receive unit, WTRU 102. WTRU 102 may be used in one or more of the communications systems described herein. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It should be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it should be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It should be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It should be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
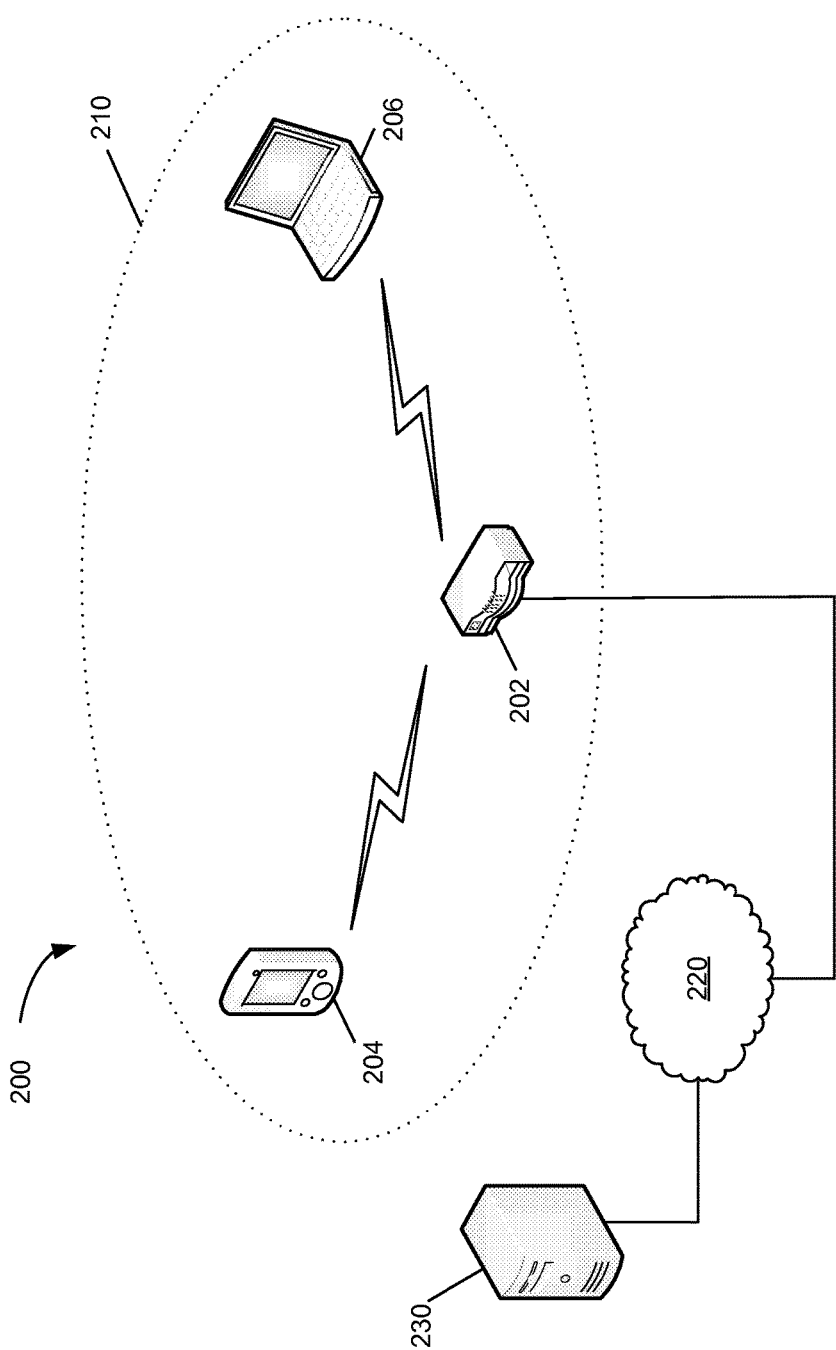
FIG. 1C depicts exemplary wireless local area network (WLAN) devices.

FIG. 1C depicts exemplary WLAN devices, one or more of which may be used to implement one or more of the features described herein, operating in a WLAN system 200. The WLAN system 200 may be configured to implement one or more protocols of the IEEE 802.11 communication standard, which may include a channel access scheme, such as DSSS, OFDM, OFDMA, etc. A WLAN may operate in a mode, e.g., an infrastructure mode, an ad-hoc mode, etc.

The WLAN system 200 may include, but is not limited to, an access point (AP) 202, a station (STA) 204, and STA 206. The STA 204 and STA 206 may be associated with the AP 202. A WLAN operating in an infrastructure mode may comprise one or more APs communicating with one or more associated STAs. An AP and STA(s) associated with the AP may comprise a basic service set (BSS). For example, AP 202, STA 204, and STA 206 may comprise BSS 210. An extended service set (ESS) may comprise one or more APs (with one or more BSSs) and STA(s) associated with the APs.

An AP may have access to, and/or interface to, a distribution system (DS), which may be wired and/or wireless and may carry traffic to and/or from the AP. Traffic to a STA in the WLAN originating from outside the WLAN may be received at an AP in the WLAN, which may send the traffic to the STA in the WLAN. Traffic originating from a STA in the WLAN to a destination outside the WLAN may be sent to an AP in the WLAN, which may send the traffic to the destination.

As depicted, the AP 202 is in communication with a network 220. The network 220 is in communication with a server 230. Traffic between STAs within the WLAN may be sent through one or more APs. For example, a source STA (e.g., STA 206) may have traffic intended for a destination STA (e.g., STA 204). STA 206 may send the traffic to AP 202, and, AP 202 may send the traffic to STA 204.

A WLAN may operate in an ad-hoc mode. The ad-hoc mode WLAN may be referred to as independent BSS. In an ad-hoc mode WLAN, the STAs may communicate directly with each other (e.g., STA 204 may communicate with STA 206 without such communication being routed through an AP).

IEEE 802.11 devices (e.g., IEEE 802.11 APs in a BSS) may use beacon frames to announce the existence of a WLAN network. An AP, such as AP 202, may transmit a beacon on a channel, e.g., a fixed channel, such as a primary channel. A STA may use a channel, such as the primary channel, to establish a connection with an AP.

STA(s) and/or AP(s) may use a Carrier Sense Multiple Access with Collision Avoidance (CSMA/CA) channel access mechanism. In CSMA/CA, a STA and/or an AP may sense the primary channel. For example, if a STA has data to send, the STA may sense the primary channel. If the primary channel is detected to be busy, the STA may back off. For example, a WLAN or portion thereof may be configured so that one STA may transmit at a given time, e.g., in a given BSS. Channel access may include RTS and/or CTS signaling. For example, an exchange of a request to send (RTS) frame may be transmitted by a sending device and a clear to send (CTS) frame that may be sent by a receiving device. For example, if an AP has data to send to a STA, the AP may send an RTS frame to the STA. If the STA is ready to receive data, the STA may respond with a CTS frame. The CTS frame may include a time value that may alert other STAs to hold off from accessing the medium while the AP initiating the RTS may transmit its data. On receiving the CTS frame from the STA, the AP may send the data to the STA.

A device may reserve spectrum via a network allocation vector (NAV) field. For example, in an IEEE 802.11 frame, the NAV field may be used to reserve a channel for a time period. A STA that wants to transmit data may set the NAV to the time for which it may expect to use the channel. When a STA sets the NAV, the NAV may be set for an associated WLAN or subset thereof (e.g., a BSS). Other STAs may count down the NAV to zero. When the counter reaches a value of zero, the NAV functionality may indicate to the other STA that the channel is now available.

The devices in a WLAN, such as an AP or STA, may include one or more of the following: a processor, a memory, a radio receiver, and/or transmitter (e.g., which may be combined in a transceiver), one or more antennas, etc. A processor function may comprise one or more processors. For example, the processor may comprise one or more of: a general purpose processor, a special purpose processor (e.g., a baseband processor, a MAC processor, etc.), a digital signal processor (DSP), Application Specific Integrated Circuits (ASICs), Field Programmable Gate Array (FPGAs) circuits, any other type of integrated circuit (IC), a state machine, and the like. The one or more processors may be integrated or not integrated with each other. The processor (e.g., the one or more processors or a subset thereof) may be integrated with one or more other functions (e.g., other functions such as memory). The processor may perform signal coding, data processing, power control, input/output processing, modulation, demodulation, and/or any other functionality that may enable the device to operate in a wireless environment, such as the WLAN of FIG. 2. The processor may be configured to execute processor executable code (e.g., instructions) including, for example, software and/or firmware instructions. For example, the processor may be configured to execute computer readable instructions included on one or more of the processor (e.g., a chipset that includes memory and a processor) or memory. Execution of the instructions may cause the device to perform one or more of the functions described herein.

A device may include one or more antennas. The device may employ multiple input multiple output (MIMO) techniques. The one or more antennas may receive a radio signal. The processor may receive the radio signal, e.g., via the one or more antennas. The one or more antennas may transmit a radio signal (e.g., based on a signal sent from the processor).

The device may have a memory that may include one or more devices for storing programming and/or data, such as processor executable code or instructions (e.g., software, firmware, etc.), electronic data, databases, or other digital information. The memory may include one or more memory units. One or more memory units may be integrated with one or more other functions (e.g., other functions included in the device, such as the processor). The memory may include a read-only memory (ROM) (e.g., erasable programmable read only memory (EPROM), electrically erasable programmable read only memory (EEPROM), etc.), random access memory (RAM), magnetic disk storage media, optical storage media, flash memory devices, and/or other non-transitory computer-readable media for storing information. The memory may be coupled to the processer. The processer may communicate with one or more entities of memory, e.g., via a system bus, directly, etc.

Figure 2:
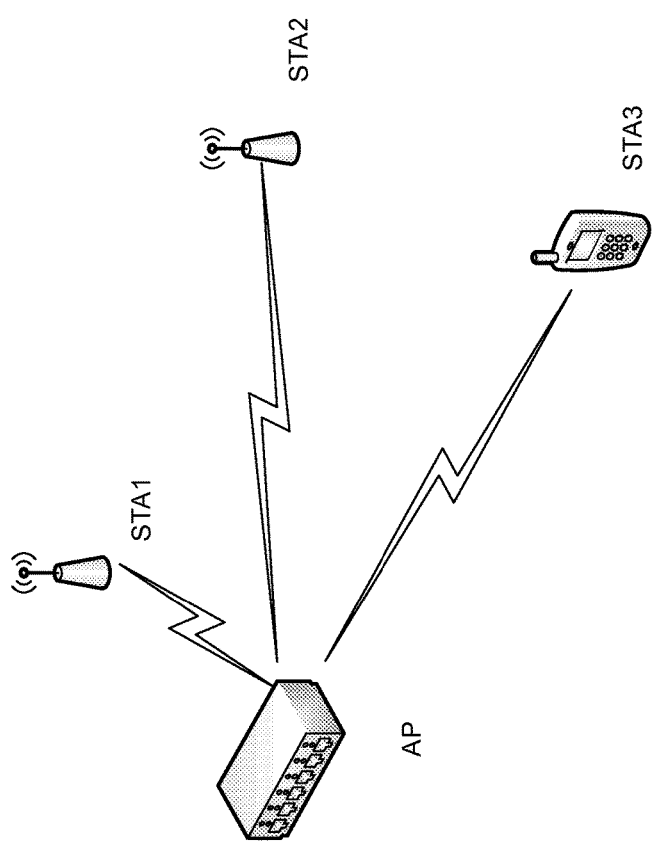
FIG. 2 depicts an exemplary WLAN system.

Turning to FIG. 2, a WLAN in infrastructure basic service set (BSS) mode may have an access point (AP) for the basic service set and one or more stations (STAs) associated with the AP. The AP may have access or interface to a distribution system (DS) or another type of wired/wireless network that may carry traffic in and out of the BSS. Traffic to STAs may originate from outside the BSS, may arrive through the AP and may be delivered to the STAs. The traffic originating from STAs to destinations outside the BSS may be sent to the AP to be delivered to the respective destinations. Traffic between STAs within the BSS may be sent through the AP where the source STA may sends traffic to the AP and the AP may deliver the traffic to the destination STA. The traffic between STAs within a BSS may be peer-to-peer traffic. Such peer-to-peer traffic may be sent directly between the source and destination STAs, e.g., with a direct link setup (DLS) using an IEEE 802.11e DLS or an IEEE 802.11z tunneled DLS (TDLS). A WLAN using an independent BSS mode may have no APs, and the STAs may communicate directly with each other. This mode of communication may be an ad-hoc mode.

Using the IEEE 802.11 infrastructure mode of operation, the AP may transmit a beacon on a fixed channel, usually the primary channel. This channel may be 20 MHz wide, and may be the operating channel of the BSS. This channel may also be used by the STAs to establish a connection with the AP. The channel access in an IEEE 802.11 system may be Carrier Sense Multiple Access with Collision Avoidance (CSMA/CA). In this mode of operation, the STAs, including the AP, may sense the primary channel. If the channel is detected to be busy, the STA may back off. One STA may transmit at any given time in a given BSS.

In IEEE 802.11ac, very high throughput (VHT) STAs may support, e.g., 20 MHz, 40 MHz, 80 MHz, and/or 160 MHz wide channels. The 40 MHz, and 80 MHz channels may be formed, e.g., by combining contiguous 20 MHz channels. A 160 MHz channel may be formed, for example, by combining eight contiguous 20 MHz channels, or by combining two non-contiguous 80 MHz channels (e.g., referred to as an 80+80 configuration). For the 80+80 configuration, the data, after channel encoding, may be passed through a segment parser that may divide it into two streams. Inverse fast Fourier transform (IFFT), and time domain, processing may be done on each stream separately. The streams may be mapped on to the two channels, and the data may be transmitted. At the receiver, this mechanism may be reversed, and the combined data may be sent to the MAC.

Figure 3:
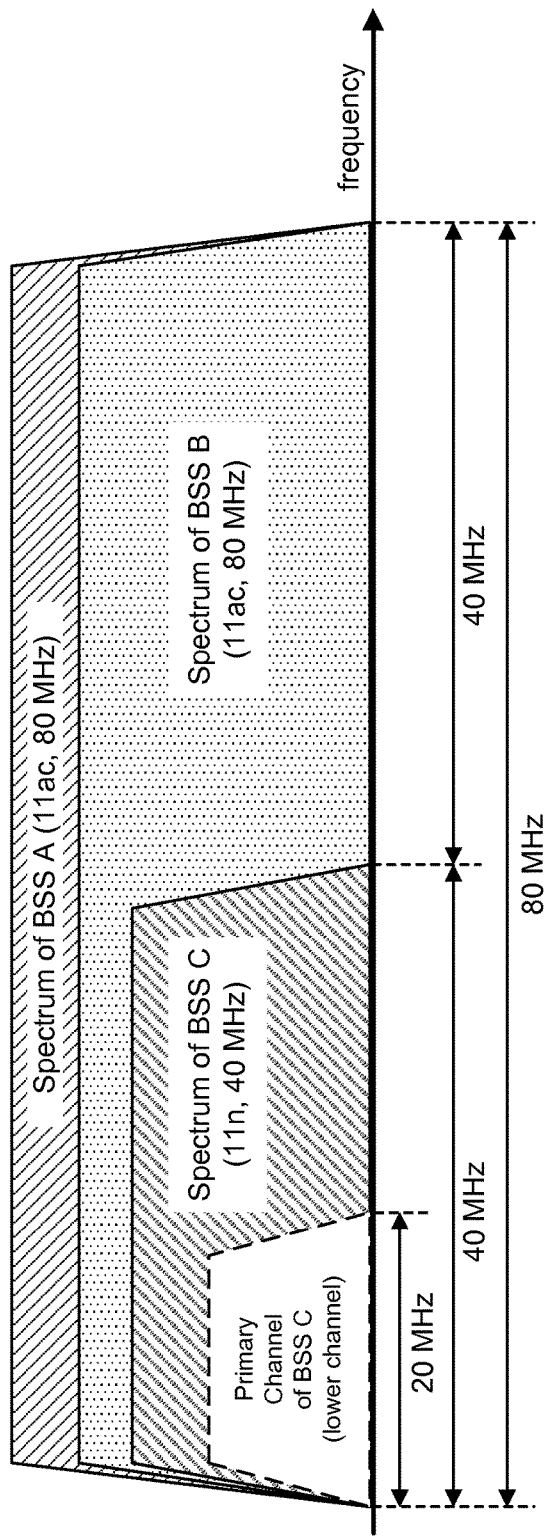
FIG. 3 depicts an example of channel alignment of an overlapping base station subsystem (OBSS) in an IEEE 802.11ac network.

FIG. 3 depicts an example of channel assignment of an overlapping base station subsystem (OBSS) in an IEEE 802.11ac network. The IEEE 802.11ac may provide rules on channel selection for OBSS. For example, if an AP or a mesh STA starts a VHT BSS that occupies one or more channels of an existing BSS, the AP may select a primary channel of the VHT BSS that may be identical to the primary channel of one of the existing BSSs. If an AP or a mesh STA chooses to select a primary channel of a VHT BSS with a 40 MHz, 80 MHz, 160 MHz, or 80+80 MHz operating channel width from among the channels on which no beacons are detected during the OBSS scans, the selected primary channel may not be identical to the secondary 20 MHz channel of any existing BSSs with a 40 MHz, 80 MHz, 160 MHz or 80+80 MHz operating channel width. The primary channel may not be overlapped with the secondary 40 MHz channel of an existing BSS with a 160 MHz or 80+80 MHz operating channel bandwidth.

An AP or mesh STA may not start a VHT BSS with a 20 MHz operating channel width on a channel that may be secondary 20 MHz channel of an existing BSS with a 40 MHz, 80 MHz, 160 MHz or 80+80 MHz operating channel width or may be overlapped with the secondary 40 MHz channel of any existing BSSs with a 160 MHz or 80+80 MHz operating channel width. An AP or a mesh STA operating a VHT BSS with a 40 MHz, 80 MHz, 160 MHz or 80+80 MHz operating channel width, on detecting an OBSS whose primary channel is the AP's or the mesh STA's secondary 20 MHz channel, may switch to 20 MHz BSS operation and/or may move to a different channel. A primary, and/or secondary channel may occupy a bandwidth other than that specified above. For example, the primary and secondary channels may occupy 5 MHz, instead of 20 MHz.

One or more spectra may be allocated in various countries around the world for wireless communication systems such as WLANs. Such spectra may be limited in the size and bandwidth of the channels they comprise. The spectra may be fragmented. The available channels may not be adjacent and may not be combined for larger bandwidth transmissions, for example, in spectra allocated below 1 GHz in various countries. WLAN systems, for example built on the IEEE 802.11 standard, may be designed to operate in such spectra. The WLAN systems may be limited to smaller bandwidths and/or lower data rates, compared to HT/VHT WLAN systems, for example, based on the 802.11n/802.11ac Standards.

IEEE 802.11ah may support sub 1 GHz modes of operation. The IEEE 802.11ah may support OFDM physical layer (PHY) that may operate at below 1 GHz. Such 802.11ah systems may operate in license-exempt bands excluding the TV White Space (TVWS). IEEE 802.11 may support enhancements to MAC layer to support the enhance PHY layer while coexisting with other systems (e.g., 802.15.4, 802.15.4g, etc.). IEEE 802.11ah may support Meter Type Control (MTC) devices in a macro coverage area. The MTC devices (e.g., sensors, meters, etc.) may have capabilities including, for example, support for extended range Wi-Fi for cellular offloading.

The spectrum allocation in one or more countries may be limited. For example, in China the 470-566 and 614-787 MHz bands may allow 1 MHz bandwidth. There may be a need to support 1 MHz only option in addition to a support for a 2 MHz with 1 MHz mode. The 802.11ah PHY may support one or more of 1, 2, 4, 8, or 16 MHz bandwidths.

The 802.11ah PHY may operate at below 1 GHz and may be based on the 802.11ac PHY. To accommodate the narrow bandwidths as needed by 802.11ah, the 802.11ac PHY may be down-clocked by a factor of 10. Support for 2, 4, 8, and 16 MHz may be achieved by 1/10 down-clocking described herein. Support for the 1 MHz bandwidth may need a PHY definition, e.g., with a Fast Fourier Transform (FFT) size of 32.

As described herein, IEEE 802.11ah may provide support for meters and sensors. For example, 1 to 6000 STAs may be supported within a BSS. The devices such as smart meters and sensors may have different requirements pertaining to the supported uplink and downlink traffic. For example, sensors and meters may be configured to periodically upload data to a server, e.g., via uplink traffic. Sensors and meters may be queried or configured by a server. When the server queries or configures a sensor and/or a meter, the server may expect that the queried data to arrive within a setup interval. The server and/or application may expect a confirmation for a configuration performed within a certain interval. The type of traffic patterns with networks having sensors and/or meters may be different than the traffic patterns assumed for the usual WLAN systems.

In the 802.11ah the SIG field of the PLCP preamble of a packet, e.g., one or more (e.g., 2) bits may be used to indicate the type of acknowledgment expected as a response (e.g., Early ACK Indication) to the packet: ACK (e.g., 00 value), BA (e.g., 01 value) and No ACK (e.g., 10 value). A value (e.g., 11 value) may be reserved for future use.

IEEE 802.11ah may provide support for Frequency Selective Transmission. Frequency selective transmissions may allow narrow band transmission in a wideband of frequencies to allow better channel quality and higher transmission data rates. IEEE 802.11ah may allow an AP to transmit one or more beacons per target beacon transmit time (TBTT) on one or more sub channels of the BSS. IEEE 802.11ah may include a submission permission bitmap in a beacon, which may identify the sub channels, the associated STAs may use to transmit.

IEEE 802.11ah may provide support for channel indication in restricted access window (RAW) and/or TWT fields. An AP may detect and/or receive one or more packets on one of the channels it may indicate in its beacon. The AP may be able to support one channel (e.g., a primary channel) or multiple channels within a BSS BW. AP may not be able to detect and/or decode parallel transmissions on different channels.

Figure 4:
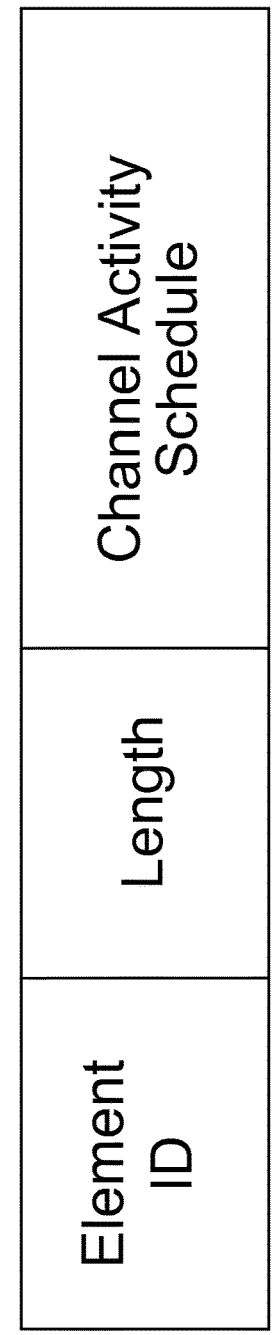
FIG. 4 depicts an exemplary format of a subchannel selective transmission (SST) element (e.g., as defined in IEEE 802.11ah).

IEEE 802.11ah may provide support for a subchannel selective transmission element. FIG. 4 depicts an example format of subchannel selective transmission element. FIG. 5 depicts an example of a channel activity schedule subfield that may be included in the SST element. As depicted in FIG. 4, the channel activity schedule may include the following fields: channel activity bitmap, uplink activity bit, downlink activity bit, maximum transmission width, activity start time, etc.

The Channel Activity Bitmap subfield may include a bitmap indicating the channels on which transmission activity may be expected or permitted. Each bit in the bitmap may correspond to one minimum width channel for the band of operation. The least significant (LS) bit may correspond to the lowest numbered operating channel of the BSS. A value (e.g., a value of 1) in a bit position in the bitmap may mean that the AP may expect activity or permit transmissions with bandwidth less than or equal to Maximum Transmission Width. The value 1 in a bit position may further mean that the AP may include the channel, after the time indicated in the Activity Start Time subfield. One or more bits in the bitmap may be set to a value 1.

The UL activity bit may indicate whether STAs associated with the AP that transmit the subfield may be permitted to transmit on the channel(s) identified by the Channel Activity Bitmap and Maximum Transmission Width at the time indicated in the Activity Start Time subfield. The DL Activity bit may indicate whether the AP that transmits the subfield may intend to transmit on the channel(s) identified by the Channel Activity Bitmap and Maximum Transmission Width at the time indicated in the Activity Start Time subfield. The Maximum Transmission Width field may indicate the maximum permitted PPDU bandwidth for a transmission on the indicated channel.

The Activity Start Time subfield may include a value that may provide a start time for when the AP may expect activity on the channel(s) indicated in the corresponding Channel Activity Bitmap. The start time may be equal to the next time, starting from the transmission of the frame containing the subfield, when the 20 least significant bits of the TSF for the BSS may match the value in the Activity Start Time subfield.

In a wireless network based on IEEE 802.11 (e.g., 802.11ah), the STAs may have different channel operating modes. An AP may indicate that one or more channels may be used for operation in its BSS for some period of time. Due to the narrow bandwidth and frequency selectivity, the primary channel of a BSS may not be the optimal (or the most preferred) channel for some STAs to transmit or receive. The best channel(s) for some STAs may not be the best channels for other STAs. One or more sets of STA may be monitoring and attempting to access different channels. A method for STAs and APs to conduct correct and efficient frequency selective transmission may be needed.

Frequency selective transmission may be provided. When an AP indicates that one or more channels may be used for its BSS' operation for some period of time, the STAs may select the best channels to conduct its operation, such as sending UL traffic to the AP. In order to have each of the STAs and the AP to conduct correct and efficient frequency selective transmissions various implementations may be provided.

Subchannel selective transmission capability indication(s) may be provided. A STA and/or an AP may indicate that they support subchannel selective transmission (SST) capabilities. For example, the STA or the AP may include a SST indication of one or more bits in frames such as a probe request and/or a probe response, a beacon, a short beacon, an association request and/or an association response, a re-association request and/or a re-association response, or other control, management, and/or extension frames. Such a SST Indication may be part of a field, or subfield of a field, or an IE. For example, one or more of the following elements may be used: the S1G Capabilities Element, S1G Operation Element, Very High Throughput (VHT) Capabilities Element, HEW (High Efficiency Wi-Fi) Capabilities Element, or VHSE (Very High Spectral Efficiency) Capabilities Element that may be included in a control, management, and/or extension frames. The STAs and/or the APs may exchange information indicating their support of SST during association and/or at other times.

An AP may indicate that its BSS may operate using SST, e.g., by including a SST Operation Indication of one or more bit in frames such as probe request and/or a probe response, a beacon, a short beacon, an association request and/or an association response, a re-association request and/or a re-association response, or other control, management, and/or extension frames. Such an SST Operation Indication may be part of a field, subfield of a field, or IE. For example, one or more of the following elements may be used: the S1G Operation Element, VHT Operation Element, HEW Operation Element, or VHSE Operation Element that may be included in a control, management, and/or extension frames. An AP may allow or reject a (re)association request from a STA based on whether the STA may support SST operations. For example, an AP may use a ResultCode of Refused_SST_Not_Supported in the MLME-ReAssociate.Response primitive. The same ResultCode may be used for the MEME-(Re)Associate.Confirm primitive. In order to support these two previous primitives, SSTCapability may be included (e.g., may be included as a part of a different parameter, such as S1GCapabilitis) in the MLME-(Re)Associate.Request and MLME-(Re)Associate.Indication primitives.

A Primary and/or Access Channel Indication may be explicitly provided. An access and/or primary channel may be a channel (e.g., of any bandwidth), which a STA may monitor and compete for access on the same or a different channel(s) that may be available during a period, such as a SST period. An AP may indicate one or more dynamic primary and/or access channel(s) using a Primary/Access Channel Information Element, e.g., as depicted by example in FIG. 6.

Figure 6:
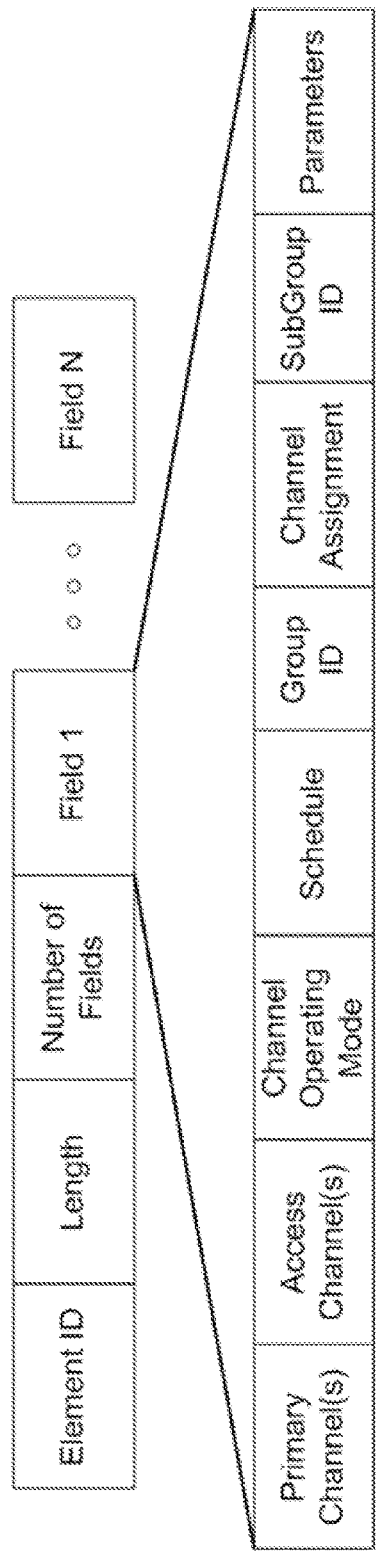
FIG. 6 depicts an example design of the primary and/or access channel indication information element (IE).

As depicted in FIG. 6, the Primary/Access Channel Indication IE may include the following fields: Element ID, Length, Number of Fields, etc. An Element ID may indicate that the current IE is a Primary/Access Channel Assignment IE. The Length field may indicate the length of the Primary/Access Channel Assignment IE. The Number of Fields may indicate the number of Primary and/or Access Channel Reporting fields that may be in the current IE. If one Primary and/or Access Channel Reporting field is included by default, the Number of fields may be absent.

Each Primary and/or Access Channel Reporting field may include the following subfields: Primary Channel(s), Access Channel(s), Channel Operating Mode, Schedule, Group ID, SubGroup ID, Channel Assignment, Parameters, etc.

The Primary Channel(s) subfield may indicate the primary channel(s) for a BSS. If a primary channel schedule is included, the primary channel(s) may be dynamic and valid for the schedule included. The primary channel(s) subfield may be indicated using a bitmap. For example, a value of 1 may indicate a channel that may be a part of the primary channel. In another example, the primary channel(s) subfield may be implemented using a pair of subfields (e.g., channel number, channel bandwidth). In another example, if the Primary and/or Access Channel Indication IE is used in conjunction with the SST element, the Primary Channel subfield may be implemented as an integer, which may indicate a positive position of the primary channel in the SST Channel Activity bitmaps. For example, if the Channel Activity bitmap in the SST Element is 01111000, then an integer value of 3 in the Primary Channel subfield may indicate that the primary channel valid is the third positive indication, which may correspond to channel 4. In another implementation, an integer value (e.g., a value 3) in the Primary Channel subfield may indicate that the primary channel valid is the third channel indicated (e.g., corresponding to channel 3).

The Access Channel(s) subfield may indicate the access channel(s) for the BSS. If an access channel schedule is included, the access channel(s) may be valid for the schedule included. The access channel(s) subfield may be indicated using a bitmap. For example, a value 1 may indicate a channel that may be a part of the access channel. In another example, the access channel(s) subfield may be implemented using a pair of subfields (e.g., channel number, channel bandwidth). In another example, if Primary/Access Channel Indication IE is used in conjunction of the SST element, the Access Channel subfield may be implemented as an integer, which may indicate the positive position of the access channel in the SST available channel(s) bitmaps. For example, if the available channels bitmap in the SST Element is 01111000, then an integer value of 3 in the Access Channel subfield may indicate that the access channel valid is the third positive indication, which may correspond to channel 4. In another implementation, an integer value of 3 in the Access Channel subfield may indicate that the access channel valid may be the third channel indicated, which may correspond to channel 3.

The Channel Operating Mode subfield may be specified as described herein using, e.g., operating bandwidth, bandwidth contiguity, directional transmission, etc. The Channel Operating Mode(s) may be encoded by a number referring to one or more particular Channel Operating Mode(s). The Channel Operating Mode(s) may be implemented as a bit map. For example, a positive indication 1 may indicate that the STA may be capable of a particular Channel Operating Mode.

The schedule subfield may include one or more of the following schedules: Primary Channel Schedule, Access Channel Schedule, Group Schedule, SubGroup Schedule, Sounding Schedule, or Preference Indication Schedule.

A Primary Channel Schedule may be associated with the dynamic primary channel and may specify when the primary channel(s) may be valid, which may be specified (e.g., using Start time, duration). The Start time may be specified in TSF Timer values or using other time units and other time references.

An Access Channel Schedule may be associated with the dynamic access channel and may specify when the access channel(s) may be valid, which may be specified (e.g., using Start time, duration). The Start time may be specified in TSF Timer values or using other time units and other time references.

The Group Schedule may provide a schedule for the group of STAs, such as when the STA may switch to conduct channel access using the indicated primary and/or access channel(s), when STA may awake to transmit and/or receive, etc. The Group Schedule may provide the duration of the interval assigned to a group of STAs.

The SubGroup Schedule may provide the schedule for the SubGroup of STAs, such as when the STA may switch to the conduct channel access using the indicated primary and/or access channel(s), or when the STA may wake up to transmit/receive. The SubGroup Schedule may comprise a Wakeup Offset from the starting time of the Group Schedule, and/or the duration of the RAW/beacon subinterval/Access Window/TXOP assigned to the SubGroup.

The Sounding Schedule may provide the schedule during which the Group/SubGroup STAs may wake up and monitor one or more of the channels for sounding frames from the AP.

The Preference Indication Schedule may provide a starting time and duration. The Preference Indication Schedule may provide a RAW/TWT/slots/beacon sub intervals during which a Group and/or SubGroup of STAs may be allowed to provide channel preference indication to the AP after conducting the sounding.

The Group ID of the Group of the STAs may access the channel, potentially using the indicated primary and/or access channel. The Group ID may be a default value that may refer to STAs that are not associated with the AP. The STAs may be grouped according to their capabilities, channel operation modes, transmit and receive capabilities, sectorized operation mode.

The SubGroup ID subfield may be the ID of a SubGroup of the STAs that may access the channel, potentially using the indicated primary and/or access channel. The SubGroup ID may be a default value that may refer to STAs that are not associated with the AP. The STAs may be divided into subgroups according to their capabilities, channel operation modes, transmit and receive capabilities, sectorized operation mode, etc.

The Channel Assignment subfield may indicate the channel assignment provided a STA, a Group or a SubGroup of STAs by the AP, which may be implemented as bitmap, or the number of the starting channel, or the number of the channels (may be of the unit bandwidth) consisting of the total assigned channel to the STA, a Group or a SubGroup of STAs.

The Parameters subfield may provide the access parameters the STAs may use to access the channel for transmissions and/or providing channel feedbacks, such as EDCA parameters, contention-based, contention-free access, etc.

FIG. 7 depicts an example design of a Channel Activity Schedule subfield. The Channel Activity Schedule subfield included in the SST may be modified to indicate the location of the primary and/or access channel(s). A Primary and/or Access Channel Indication may be implemented as a bitmap. A value 1 may indicate a channel that may be a part of the primary and/or access channel. The Primary and/or Access Channel Indication may be implemented using a pair of subfields (e.g., channel number, channel bandwidth). The Primary and/or Access Channel Indication may be implemented as an integer, which may indicate the positive position of the primary and/or access channel in Channel Activity bitmap. For example, if the Channel Activity bitmap in the SST Element is 01111000, then an integer value of 3 in the Primary and/or Access Channel Indication may indicate that the primary and/or access channel that may be valid may be the third positive indication, which may correspond to channel 4. For example, an integer value of 3 in the Primary and/or Access Channel Indication may indicate that the primary and/or access channel valid may be the third channel indicated which may correspond to channel 3.

A subset of the subfields of the Primary and/or Access Channel Indication IE may be implemented as a subfield or subsets of subfields of an IE. Such an IE may include, for example, the SST Element, the S1G/VHT/HEW/VHSE Operation Element, or as a part of any Action frames, Action without ACK frames, control, management, extension frames, such as beacon, short beacon, Probe Response, Association Response, S1G Action frame or in MAC/PLCP headers.

An Implicit Primary and/or Access Channel Indication may be provided. The primary and/or access channel may be implicitly indicated by the AP in frames such as beacon, short beacon, or in control, management or extension frames. Such implicit indication of primary and/or access channel may be included in a field, a subfield, or an IE, such as SST Element, S1G Operation element, HEW Operation Element, VHSE Operation Element, etc. For example, if an SST Element or any other type of Element indicates that one or more channels may be used for some period of the time for SST, the primary and/or access channel may be implicitly indicated to be the lowest or highest channel indicated in the SST.

If the AP has previously indicated a primary and/or access channel for its BSS, and if the available channels for some period of time indicated in, e.g., the SST element, include the primary and/or access channel, then the primary and/or access channel may remain the same as previously indicated by the AP. If the available channels for some period of time indicated in, e.g., the SST element, do not include the primary and/or access channel which the AP has previously indicated, then one or more channel(s) at a default place may be considered as the primary channel or access channel. The primary and/or access channel may be the highest and lowest channel(s) indicated or the higher or lower part of a default channel.

SST using implicit and/or explicit Primary and/or Access Channel Indication may be provided. In explicit primary and/or access channel indication, an AP may include a Primary/Access Channel Indication IE, in conjunction with or instead of an SST Element or a modified SST Element., The Primary/Access Channel Indication IE may be provided in frames such as beacon, short beacon, Probe Response, (Re)Association Response, or other type of control, management, or extension frames, to indicate the location of the primary and/or access channels for its BSS for some periods of time, which may be the beacon (sub)interval(s), RAWs, or TWTs following the beacon or short beacon.

In implicit primary and/or access channel indication, an AP may implicitly indicate the location of the Primary and/or Access channels using the locations or fields in one of its field or subfields (e.g., the Channel Activity Bitmap in the SST element) in frames such as beacon, short beacon, or other type of control, management, or extension frames, to indicate the location of the primary and/or access channels for its BSS for some periods of time, which may be the beacon (sub)interval(s) following the beacon or short beacon.

A STA that is capable of SST and is allowed to access medium based on, for example, its RAW/TWT or other schedule assignment, or its (sub) group ID. The information may be indicated in a beacon or short beacon or a resource allocation frame, etc. Such a STA may determine the location of the primary and/or access channel based on the information received from the AP.

The STA may monitor the primary channel and/or the access channel to compete for medium access. Assuming that, for example, the best channel for a STA is channel 1, and the primary and/or access channel is channel 2, then in one example, the STA may monitor both Channel 1 and 2. If the STA has gained access to both channels, it may transmit duplicate frames, such as duplicated RTS, or duplicated data on both channels 1 and 2. The AP may then respond with duplicated frames, such as duplicated CTS or ACK, on both channel 1 and 2. The STA and the AP may continue their packet exchanges until their transmissions are completed. The STA and the AP may reserve the medium by setting the NAV on the primary and/or access channel and then transmit their data packets/ACKs on Channel 1, which is the best for the STA. The STA and the AP may reserve the medium by setting the NAV on both the primary and/or access channels and the best channel for the STA/AP, e.g., channels 1 and 2, and transmit their data packets/ACKs on Channel 1.

Other STAs that attempt to access the medium to communicate with the AP may monitor Channel 2 and may transmit when they are able to reserve the medium or gain access on the primary and/or access channel. One or more STAs may transmit when they are able to reserve the medium or gain access on the primary and/or access channel and their best channels, e.g., the channels on which they intend to use for the main bulk of their transmissions by, e.g., a successful RTS/CTS exchange with the AP.

AP Driven Frequency Selective Transmissions may be provided. The SST may be AP driven. An AP may specify intervals for DL transmissions. The STAs may monitor the primary and/or access channel and/or the entire available channels indicated by the Channel Activity bitmap to receive packets.

An AP may specify intervals for channel feedbacks for the STAs. One STA may be assigned to each slot in the interval. Each of the STAs may provide their feedback on their best channel or on the primary and/or access channel indicated. The AP may provide a schedule through a beacon, short beacon, a resource allocation frame, etc., to provide a schedule and channel assignment for the STAs so that the STAs may conduct UL and DL transmissions with the AP.

Although features and elements are described above in particular combinations, one of ordinary skill in the art will appreciate that each feature or element may be used alone or in any combination with the other features and elements. Other than the 802.11 protocols described herein, the features and elements described herein may be applicable to other wireless systems. Although the features and elements described herein may have been described for uplink operation, the methods and procedures may be applied to downlink operation. Although SIFS may have been used herein to indicate various inter frame spacing, other inter frame spacing, e.g., RIFS or other agreed time interval may be applied. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, optical media such as CD-ROM disks, and digital versatile disks (DVDs). A processor in association with software may be used to implement a radio frequency transceiver for use in a WTRU, WTRU, terminal, base station, RNC, or any host computer.

The invention claimed is:

1. A first IEEE 802.11 device comprising:
   an antenna;
   a memory; and
   a processor operatively coupled to the antenna, the processor and the antenna configured to:
   receive, from a second IEEE 802.11 device, an association response frame or a reassociation response frame, wherein the association response frame or a reassociation response frame comprises an indication that subchannel selective transmission operation is currently being used and a first channel bitmap;
   receive, from the second IEEE 802.11 device, a short beacon frame, wherein the short beacon frame comprises a second channel bitmap, and wherein there is an indication within one or more of the first channel bitmap and the second channel bitmap that a channel is available for use by the first IEEE 802.11 device during a subchannel selective transmission period following the short beacon frame; and
   transmit on the channel during the subchannel selective transmission period.

2. The first IEEE 802.11 device of claim 1, wherein the processor is further configured to receive a sounding schedule.

3. The first IEEE 802.11 device of claim 2, wherein the processor and the antenna are further configured to monitor a channel for a sounding frame based on the received sounding schedule.

4. The first IEEE 802.11 device of claim 1, wherein the channel is associated with a basic service set that comprises the first IEEE 802.11 device and the second IEEE 802.11 device.

5. The first IEEE 802.11 device of claim 1, wherein the first IEEE 802.11 device is an IEEE 802.11 station.

6. The first IEEE 802.11 device of claim 2, wherein the second IEEE 802.11 device is an IEEE 802.11 access point.

7. A method associated with a first IEEE 802.11 device, the method comprising:
   receiving, from a second IEEE 802.11 device, an association response frame or a reassociation response frame, wherein the an association response frame or a reassociation response frame comprises an indication that subchannel selective transmission operation is currently being used and a first channel bitmap;
   receiving, from the second IEEE 802.11 device, a short beacon frame, wherein the short beacon frame comprises a second channel bitmap, and wherein there is an indication within one or more of the first channel bitmap and the second channel bitmap that a channel is available for use by the first IEEE 802.11 device during a subchannel selective transmission period following the short beacon; and
   transmitting on the channel during the subchannel selective transmission.

8. The method of claim 7, further comprising receiving a sounding schedule.

9. The method of claim 8, further comprising monitoring a channel for a sounding frame based on the received sounding schedule.

10. The method of claim 7, wherein the channel is associated with a basic service set that comprises the first IEEE 802.11 device and the second IEEE 802.11 device.

11. The method of claim 7, wherein the first IEEE 802.11 device is an IEEE 802.11 station.

12. The method of claim 8, wherein the second IEEE 802.11 device is an IEEE 802.11 access point.

* * * * *

UNITED STATES PATENT AND TRADEMARK OFFICE
CERTIFICATE OF CORRECTION

PATENT NO. : 10,206,218 B2
APPLICATION NO. : 14/896012
DATED : February 12, 2019
INVENTOR(S) : Xiaofei Wang et al.

It is certified that error appears in the above-identified patent and that said Letters Patent is hereby corrected as shown below:

In the Claims

In Claim 1, at Column 16, Line 54, after the word "or", delete "a" and insert therefor --the--.

In Claim 7, at Column 17, Line 20, after the word "the", delete "an".

In Claim 7, at Column 17, Line 20, after the word "or", delete "a" and insert therefor --the--.

Signed and Sealed this
Sixteenth Day of July, 2019

Andrei Iancu
*Director of the United States Patent and Trademark Office*